No. 618,423. Patented Jan. 31, 1899.
K. W. R. LYNEN.
CENTRIFUGAL GOVERNOR AND SPEED INDICATOR.
(Application filed Aug. 5, 1898.)
(No Model.)
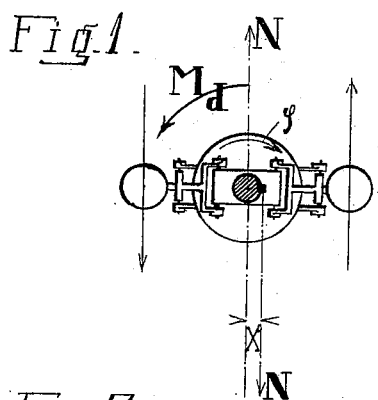
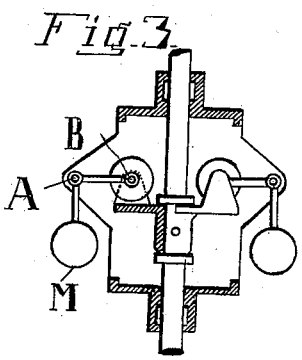
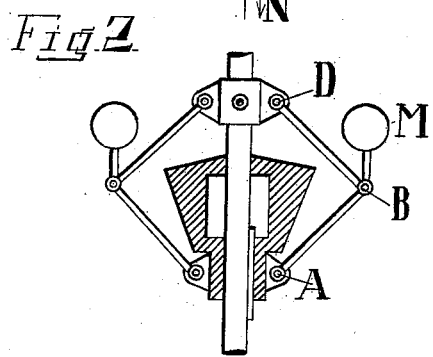
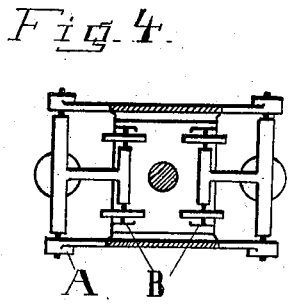
Witnesses:
Inventor
Karl Wilhelm Richard Lynen
By Richard
his Attorneys

UNITED STATES PATENT OFFICE.

KARL WILHELM RICHARD LYNEN, OF AACHEN, GERMANY.

CENTRIFUGAL GOVERNOR AND SPEED-INDICATOR.

SPECIFICATION forming part of Letters Patent No. 618,423, dated January 31, 1899.

Application filed August 5, 1898. Serial No. 687,851. (No model.)

*To all whom it may concern:*

Be it known that I, KARL WILHELM RICHARD LYNEN, a subject of the King of Prussia, German Emperor, and a resident of Aachen, Germany, have invented certain new and useful Improvements in Centrifugal Governors and Speed-Indicators, of which the following is a specification.

A centrifugal governor as a device for adjusting the valve or other controlling device of an engine or motor is itself to be considered as a working engine or motor whose useful effect is that work which is done in adjusting or operating the said valve or other controlling device. With a mean degree E of insensibility of the governor this useful effect is, as is known, E times the work done by the centrifugal force of the governor. Since the degree of insensibility of the governor always has a small value, the useful work done by a governor is only a small amount of the total work done thereby. For example, when $E = \frac{1}{50}$ the useful work done is only two per cent. of the work done by the centrifugal force. In view of these relations the internal friction in a governor assumes an enormously-increased importance, since it very considerably reduces the efficiency of the governor. If the internal friction amount, for example, to four per cent. of the work done by the centrifugal force, which can very easily take place, the efficiency of the governor, considered as a motor, taking $E = \frac{1}{50}$, will amount to $$\eta = \frac{\text{useful work done}}{\text{useful work done} + \text{internal friction}} = \frac{0.02}{0.02 + 0.04} = \frac{1}{3}.$$

This is a very low value for a motor. From this it follows that the utmost efforts should be made to reduce the internal friction of the governor.

In addition to the forces acting in the plane of the governor—such as centrifugal force, pendulum weight, and sleeve load—the forces produced by the inertia of the parts during variations in the speed of the engine and acting perpendicularly to the plane of the governor form a second source of friction in the governor. These forces, due to the inertia of the parts, tend to interfere with the driving power of the governor, since they produce, as indicated in Figure 1 of the accompanying drawings, a turning movement $M_d$ the magnitude of which is given by the equation $M_d = \varphi T$, where T is the moment of inertia of the rotating masses of the governor relatively to the axis of rotation thereof, and $\varphi$ the angular acceleration of this axis of rotation. In the governors heretofore employed this couple is taken up by a driving-key or feather in the governor-spindle, a normal pressure N being set up at the place where the couple is transmitted to the said spindle, the magnitude of which is determined from the equation $N.x = M_d$, as indicated in Fig. 1.

With the usual small diameters of the governor-spindles the length of the lever-arm $x$ is small and the normal pressure N, and consequently the work to be done in overcoming the friction in moving the sleeve relatively to the driving-key or feather, is large. This applies more particularly to governors with moving points of suspension of the pendulums and with a sleeve-weight rigidly connected with the sleeve, as shown in Fig. 2 of the accompanying drawings. The feather or other device whereby the sleeve is driven must here accelerate the motion of the whole of the rotating masses of the governor. This frictional work to be overcome at the driving connection is equal to zero, with any desired value of N, if the transmission of pressure from the shaft or spindle of the governor to the masses thereof to be accelerated takes place at a point at which there is no relative motion between the governor and the axis of rotation during deflection or displacement of the parts of the governor which actuate the valve-gear or the like. This condition can be approximately fulfilled in a governor such as that shown in Figs. 3 and 4 of the accompanying drawings. This governor comprises a pair of pendulums, the point of suspension A of each of which is guided parallel to the axis of rotation by a sleeve sliding over the said axis of rotation, while its point of support B is guided perpendicular to the axis of rotation by means of a roller which rolls on a slide-way secured to the axis of rotation. Each of these pendulums, which can be either simple or cosine pendulums, is so mounted in the governor that the arm A B in the mean position of the balls is perpendicular to the axis of rotation of the governor. If the point B of the pendulum is selected as the place where the driving forces are to be transmitted between the governor and the axis of rotation, (which, for example, can be effected by allowing a lug cast on the said slideway to press at B on the axis of the roller carried by the pendulum,) the relative motion between the governor and the governor shaft or spindle at the place where the pressure is transmitted is almost equal to zero, even if the governor-balls are displaced or deflected to their full extent. In this manner one of the causes of friction in the governor is eliminated.

What has been said with respect to the friction of centrifugal governors applies in a higher degree to speed-indicators constructed with a centrifugal pendulum or cosine pendulum, since the useful work done thereby is much less in proportion to their internal friction than in centrifugal governors for engines or motors.

Having now described my invention, what I claim as new, and desire to secure by Letters Patent, is—

A centrifugal governor or speed-indicator comprising an angular pendulum, suspending means therefor guided to move parallel to the axis of rotation, a point of support for the pendulum guided to move perpendicularly to the axis of rotation, the inner arm of the angular pendulum being perpendicular to the axis of rotation in the mean position of the balls and the pressure between the governor and the axis of rotation being transmitted through a point at or near the end of said inner arm, substantially as described.

In witness whereof I have hereunto set my hand in presence of two witnesses.

KARL WILHELM RICHARD LYNEN.

Witnesses:
DIETRICH BECKER,
EUGEN SIMON.